US012195027B2

United States Patent
Vis et al.

(10) Patent No.: US 12,195,027 B2
(45) Date of Patent: Jan. 14, 2025

(54) METHOD FOR DEVELOPING A REMOTE COMMAND DATA PACKAGE FOR A MOTOR VEHICLE BY A CENTRAL ELECTRONIC COMPUTING DEVICE, AS WELL AS A CENTRAL ELECTRONIC COMPUTING DEVICE

(71) Applicant: MERCEDES-BENZ GROUP AG, Stuttgart (DE)

(72) Inventors: Marc Vis, Seattle, WA (US); Fabian Hartmann, Stuttgart (DE); Matthew Clark, Federal Way, WA (US); Alexandre Borella, Seattle, WA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 331 days.

(21) Appl. No.: 17/627,180

(22) PCT Filed: Jul. 14, 2020

(86) PCT No.: PCT/EP2020/069842
§ 371 (c)(1),
(2) Date: Jan. 14, 2022

(87) PCT Pub. No.: WO2021/009152
PCT Pub. Date: Jan. 21, 2021

(65) Prior Publication Data
US 2022/0266849 A1    Aug. 25, 2022

Related U.S. Application Data

(60) Provisional application No. 62/874,901, filed on Jul. 16, 2019.

(51) Int. Cl.
*G06F 9/44* (2018.01)
*B60W 50/14* (2020.01)
*G07C 5/00* (2006.01)

(52) U.S. Cl.
CPC ............ *B60W 50/14* (2013.01); *G07C 5/008* (2013.01); *B60W 2050/146* (2013.01)

(58) Field of Classification Search
None
See application file for complete search history.

(56) References Cited

U.S. PATENT DOCUMENTS 10,642,715 B1 * 5/2020 Simca ................. G06F 11/3612
11,372,626 B2 * 6/2022 White, III ................. G06F 8/71
(Continued)

OTHER PUBLICATIONS

International Search Report and Written Opinion mailed Oct. 22, 2020 in related/corresponding International Application No. PCT/EP2020/069842.
(Continued)

*Primary Examiner* — Qamrun Nahar
(74) *Attorney, Agent, or Firm* — PATENT PORTFOLIO BUILDERS PLLC (57) ABSTRACT

A method for developing a remote command data package for a motor vehicle by a central electronic computing device involves the central electronic computing device providing a plurality of templates in a user interface of the central electronic computing device. A single template defines at least one generalized vehicle command. A developer of the remote command data package provides a workflow defining logic for the remote command data package using the user interface. The developer provides the workflow using at least one template of the plurality of templates and the central electronic computing device transforms the workflow into the vehicle command depending on the used template.

8 Claims, 7 Drawing Sheets

(56) References Cited

U.S. PATENT DOCUMENTS

| | | | |
|---|---|---|---|
| 11,436,504 B1* | 9/2022 | Lukarski | G06N 5/04 |
| 11,560,037 B2* | 1/2023 | Yu | B60H 1/00878 |
| 2016/0357521 A1 | 12/2016 | Zhang et al. | |
| 2017/0132118 A1* | 5/2017 | Stefan | G06F 11/3684 |
| 2020/0301679 A1* | 9/2020 | Eteminan | G06F 11/3688 |
| 2022/0156665 A1* | 5/2022 | Beth | B60W 60/001 |

OTHER PUBLICATIONS

Nguyen et al.; "Development of Hardware-in-the-Loop Simulation Based on Gazebo and Pixhawk for Unmanned Aerial Vehicles;" International Journal of Aeronautical & Space Sciences; Mar. 2018; vol. 19, No. 1.

Arifianto et al.; "Optimal control of a small fixed-wing UAV about concatenated trajectories;" Control Engineering Practice; Jul. 2015; pp. 113-132; vol. 40.

Office Action dated Mar. 10, 2023 in related/corresponding EP Application No. 20740606.7.

* cited by examiner

METHOD FOR DEVELOPING A REMOTE COMMAND DATA PACKAGE FOR A MOTOR VEHICLE BY A CENTRAL ELECTRONIC COMPUTING DEVICE, AS WELL AS A CENTRAL ELECTRONIC COMPUTING DEVICE

FIELD OF THE INVENTION

Exemplary embodiments of the invention relate to the field of automobiles, and more specifically to a method for developing a remote command data package for a motor vehicle by a central electronic computing device, as well as a corresponding computer-readable storage medium and a corresponding central electronic computing device.

BACKGROUND INFORMATION

Connected vehicles are becoming more and more common. Connected vehicles may connect to public and/or private networks, such as a serial data network. In such situations, messages may be sent between the vehicle and the vehicle's owner. For example, a back-end server could communicate with the vehicle using short message service messages.

However, existing vehicle communication systems provide limited functionality. For example, existing vehicle communication systems may require the use of vehicle-specific commands. In addition, it may be difficult to develop commands for vehicle communication systems.

SUMMARY OF THE INVENTION

Exemplary embodiments of the invention are directed to a method, a computer-readable storage medium as well as a central electronic computing device, by which a remote command data package for a motor vehicle may be provided by a developer in a faster way.

One aspect of the invention relates to a method for developing a remote command data package for a motor vehicle by a central electronic computing device, wherein the central electronic computing device provides a plurality of templates in a user interface of the central electronic computing device, wherein a single template defines at least one generalized vehicle command, wherein a developer of the remote command data package provides a workflow defining logic for the remote command data package by using the user interface, wherein the developer provides the workflow by using at least one template of the plurality of templates, and the central electronic computing device transforms the workflow into the vehicle command depending on the used template.

Therefore, a more efficient way to develop a remote command data package is provided. Additionally, a faster way to develop a remote command data package for the motor vehicle may also be provided.

In particular, in an embodiment of the invention, the invention is directed to technologies for developing and/or executing remote commands for vehicles, for example, cars, trucks, and/or other types of vehicles. For example, a serverless cloud platform may be provided for managing vehicle commands. Vehicle commands may be created by a developer. The vehicle commands may be abstract vehicle commands, which may also be referred to as a generalized vehicle command. The vehicle commands may be executed by the platform, for example translated into vehicle specific commands and communicated to the motor vehicle, in particular to the specific motor vehicle.

In one embodiment of the invention, the at least one template is developed by the developer by using the user interface. In other words, the workflow as well as the template may be developed by the developer. Therefore, new templates may be developed by different developers for the central electronic computing device. In some implementations, the at least one template is created by the developer. The template definitions are used to translate data received by the platform into the specific format needed by the motor vehicle. For example, the vehicle commands may be provided to the platform as abstract vehicle commands.

In another embodiment, the vehicle commands are provided as abstract vehicle commands. In other words, the vehicle commands may be generalized vehicle commands. For example, the vehicle commands may be provided to the platform as abstract vehicle commands. The platform may receive the abstract vehicle commands and map the commands to the specific vehicle commands needed by the particular motor vehicle which is the target of the communication. For example, the abstract vehicle commands may be translated into a specific binary format, for example, a specific payload format.

In another embodiment, the central electronic computing device is provided as a serverless cloud computing platform. For example, cloud computing services may be allocated when needed and, for example, static cloud servers may not need to be maintained, and capacity may scale up or down in response to demand.

In another embodiment, the central electronic computing device comprises a communication device for communication with the motor vehicle and the remote command data package is transmitted via the communication device to the motor vehicle. Therefore, a newly developed remote command data package is provided for the motor vehicle. The central electronic computing device stores the remote command data package and after storing the remote command data package, the remote command data package is transmitted to the motor vehicle for execution.

In another embodiment, the developed workflow and/or the developed template is tested by a testing unit of the central electronic computing device. For example, the developed workflow and/or the developed template may be compiled by a compiler as the testing unit. Therefore, the corresponding remote command data package is tested wherein the tested remote command data package is transmitted to the motor vehicle.

In a further embodiment of the invention, depending on the tested workflow, a tested remote command data package is transmitted to the motor vehicle. Therefore, just a tested remote command data package is transmitted to the motor vehicle. This has the advantage that just tested workflows and tested remote command data packages may be transmitted for execution to the motor vehicle.

In another embodiment, the electronic computing device provides the at least one template depending on a characterizing parameter of the motor vehicle. For example, the characterizing parameter may be a type series or a model series of the motor vehicle. Therefore, specific remote command data packages may be developed from the developer. In particular, the developer may not be able to use the wrong templates. Therefore, a faster way for developing the at least one remote command data package is provided.

Another aspect of the invention relates to a computer-readable storage medium, storing computer-executable instructions for causing a central electronic computing device to perform operations according to a method according to the preceding aspect. In particular, the computer-readable storage medium comprises a computer program product with the computer-executable instructions.

A further aspect of the invention relates to a central electronic computing device with at least one user interface and one computer-readable storage medium according to the preceding aspect, wherein the central electronic computing device is configured to perform a method according to the preceding aspect. In particular, the method is performed by the central electronic computing device.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

BRIEF DESCRIPTION OF THE DRAWINGS

The novel features and characteristics of the disclosure are set forth in the appended claims. The accompanying drawings, which are incorporated in and constitute a part of this disclosure, illustrate exemplary embodiments and together with the description serve to explain the disclosed principles. In the figures, the same reference signs are used throughout the figures to refer to identical features and components. Some embodiments of a system and/or method in accordance with embodiments of the present subject matter are now described below, by way of example only, and with reference to the accompanying figures.

The drawings show in.

In the figures the same elements or elements having the same function are indicated by the same reference signs.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion so that a setup, device, or method that comprises a list of components or steps does not include only those components or steps but may include other components or steps not expressly listed or inherent to such setup or device or method. In other words, one or more elements in a system or apparatus preceded by "comprises" or "comprise" does not or do not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
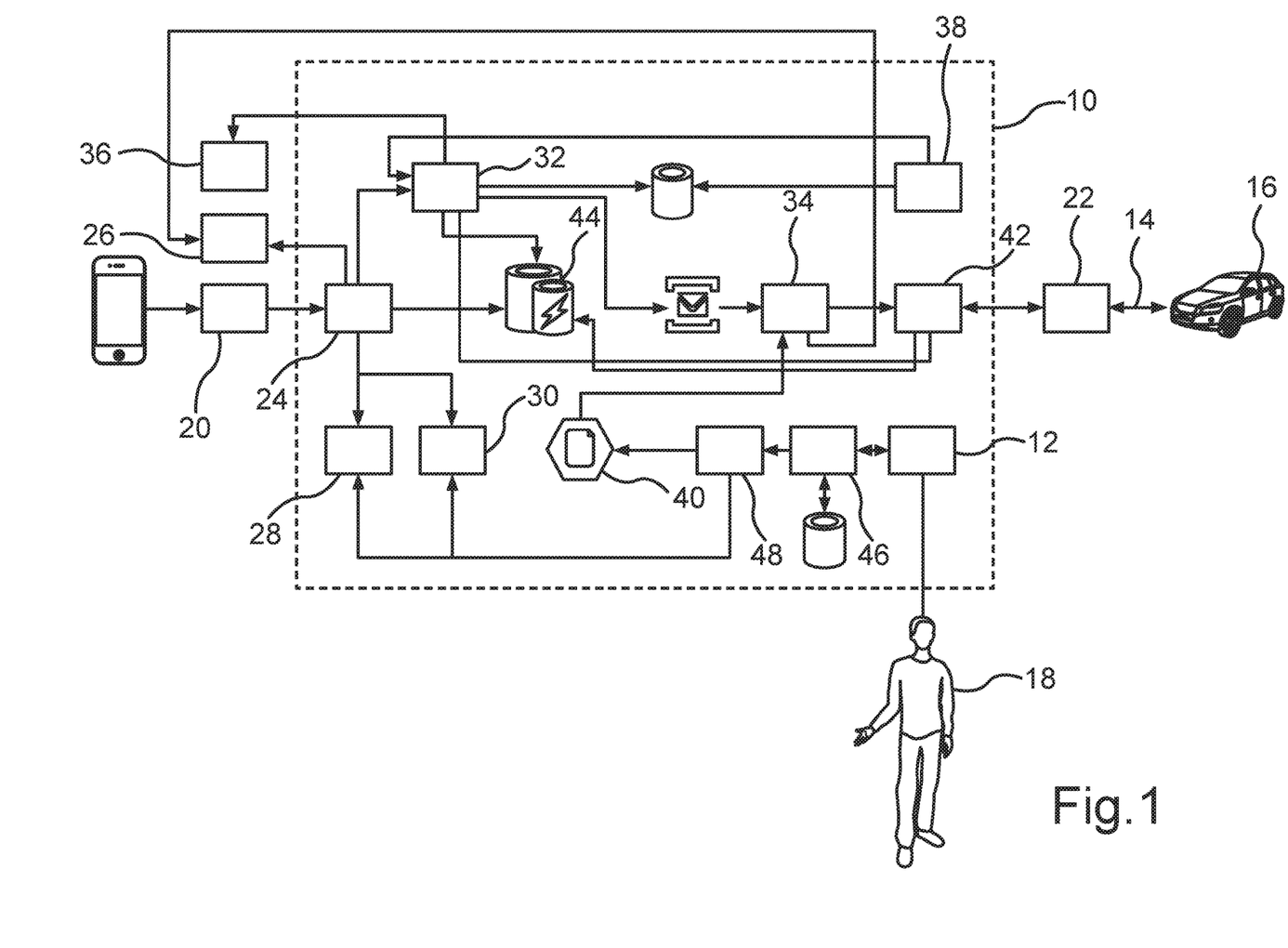
FIG. 1 a schematic block diagram of a central electronic computing device according to an embodiment of the invention.

FIG. 1 shows a schematic block diagram of an embodiment of a central electronic computing device 10 with at least one user interface 12 and one computer-readable storage medium.

In the embodiment of the invention shown in FIG. 1, a method for developing a remote command data package 14 for a motor vehicle 16 by the central electronic computing device 10 is presented. The central electronic computing device 10 provides a plurality of templates in the user interface 12 of the central electronic computing device 10, wherein a single template defines at least one generalized vehicle command, wherein a developer 18 of the remote command data package 14 provides a workflow 84 (FIG. 4) defining logic for the remote command data package 14 by using the user interface 12, wherein the developer 18 provides the workflow 84 by using at least one template of the plurality of templates and the central electronic computing device 10 transforms the workflow 84 into the vehicle command depending on the used template.

The central electronic computing device 10 may comprise several components, which may receive a message from a VAG 20 (Vehicle Application Gateway) and may send a response back to the VAG 20. Furthermore, the several components may send messages to each other and send messages to and from a communication device 22 in order to complete commands. Each component of the central electronic computing device 10 plays a role in this process for developing a workflow 84 or a template.

The main entry of the electronic computing device 10 may be a block called FIREMAN 24 (Filter Ingress, Routes, Enqueuement MANager). FIREMAN 24 may ingest the process by receiving a message from the VAG 20 or receiving data from a VVR 26 (Virtual Vehicle Representation). Furthermore, the FIREMAN 24 may receive commands and templates from a CODER 28 or a block called SCRIBE 30. FIREMAN 24 may store information about the process in a block called COAST 32 and a CACHE 44 for later access. Furthermore, FIREMAN 24 calls COAST 32 to enqueue the process. FIREMAN 24 may also call for the status of processes or service names, wherein a service name refers to a vehicle service, for example doors, auxheat, or engine. From other end points, FIREMAN 24 obtains information about a particular process by calling COAST 32. Further, FIREMAN 24 obtains information about the most recent one of each command type of a particular command by calling COAST 32 which queries a database.

COAST 32 is the main service for FIREMAN 24 and for a block called SCRIPT 34, where COAST 32 is called to store and retrieve processes. When called, COAST 32 creates a coast event based on the status of the process, and events are handled appropriately based on event type in case any other process is in progress for the same command and when/if a process is rejected. COAST 32 also writes to Redis (an in-memory data structure store, used as a database, cache and message broker) and postgres (an object-relational database system), publishes to a block called VEP 36 (Vehicle Event Push) on any new processes or the updating or completing of all processes. COAST 32 may call a TIMEOUT SCHEDULER 38 to initiate the timing out of processes that are yet to be completed for more than, for example, eight minutes. COAST 32 queues new processes and time-out processes to a Service Bus for SCRIPT 34 to pick up.

SCRIPT 34 executes everything from a QUEUE 40 that is written by COAST 32 and a block called PROTOSS 42 (PROTOcol State Service), wherein PROTOSS 42 is the gateway between SCRIPT 34 and the communication device 22. SCRIPT 34 reads from the Redis CACHE 44, reads an update status of processes from COAST 32 and executes each step of the workflow 84, calling PROTOSS 42 in each such step that requires doing so. SCRIPT 34 will run the next sequence of steps in a particular handler for the process it gets from the QUEUE 40 based on the trigger.

Steps should start with obtaining information about the process from the CACHE 44 and calling COAST 32 to let it know the updated process status. Thereafter there are a variety of next possible steps. A first possible step is that if the step updates the VVR 26 data about a process then it calls VVR 26. Another step involves reaching the motor vehicle 16 in any way, wherein PROTOSS 42 is called. In another step, an external resource is called, such as one where PROTOSS 42 will call the communication device 22, and SCRIPT 34 will have a "StepCompleteAction" set to "wait" and will not perform a next step until it picks up a queue message to be processed from the QUEUE 40. In other steps, if StepCompleteAction is set to simply run the next step, then SCRIPT 34 will continue on to the next step. If there is an error along the way, SCRIPT 34 will still send an acknowledgement message to PROTOSS 42 to send to the telemetric control unit (TCU) so that the TCU knows the response has been received but then the TCU will process to the error step, skipping the other steps.

After completing a step, SCRIPT 34 will check if that step says to pause afterwards or continue to the next step. If it is a step where it should continue, it will, otherwise, it will wait until the QUEUE 44 listener finds something in the service bus.

PROTOSS 42 is the gateway between SCRIPT 34 and the communication device 22. It represents the entrance and exit from the central electronic computing device 10 to the motor vehicle 16. PROTOSS 42 should also start by getting all the vehicle information out of the CACHE 44. Then, it calls the communication device 22, which calls the motor vehicle 16, and PROTOSS 42 should get an acknowledgement and sometimes another response. If there is another response, PROTOSS 42 will keep an open connection and wait for a response from the motor vehicle 16. In these steps, SCRIPT 32 will be set to pause and will not continue onto the next step until the response is received. The next step is performed when PROTOSS 42 gets a response and enqueues a new message to the service bus for SCRIPT 34 to pick up.

The CACHE 44 is where all the information about a process is stored for quick access. A minimal version of each process is disseminated throughout the electronic computing device 10, but each process has a unique bit so that the full version of the process may be retrieved from the CACHE 44 by any service or described module at any time, provided that that process is still in the CACHE 44. This allows for fast retrieval of processes by process ID (PID) so that a process' full information set does not need to be passed between the different components of the central electronic computing device 10.

The QUEUE 40 is the prior sequencing mechanism for processing commands. Anything ready to be executed is placed here and SCRIPT 34 will pick the command up in order to execute it. If a multi-queue context exists, SCRIPT 34 will allow multiple users to use the same QUEUE 40 at the same time, and if a multi-queue context does not exist, the QUEUE 40 is limited to one user at a time. It is possible that there may be many queues. If the queues are dealing with different vehicles, then it is no problem for multiple SCRIPTS 34 and multiple PROTOSS 42 to be running commands at the same time, in any QUEUE 40 context, since they are working with different QUEUEs 40.

A CODER 28 holds the workflow definitions used to execute a process. CODER 28 is editable from the user interface 12 so that when FIREMAN 24 retrieves workflow definition information, FIREMAN 24 will obtain the necessary workflow information to be able to complete a command. CODER 28 also builds/publishes to the CACHE 40.

SCRIBE 30 holds the templates for commands required to execute the command for a given mobile vehicle 16. It is editable from the user interface 12 and FIREMAN 24 may call it with information about the service, command, version, and protocol identifier in order to get necessary template IDs for a command.

The user interface 12 allows editing of information in which it is set through a block called CUBS 46 and a block called CAST 48 to be available to the CODER 28, SCRIBE 30 and the QUEUE 40.

CUBS 46 is a backend service for the user interface 12. It provides user interface information for the developer 18. The block CAST 48 transforms an index and moves it into the CODER 28, SCRIBE 30 and the QUEUE 40, which FIREMAN 24 and SCRIPT 34 can pick up at run time and execute any commands stored here.

In the VVR 26, data is stored and retrieved about vehicles, so it is known in the system, for example, which doors are locked, or which auxiliary heat configurations are in use, or vehicles' TCU information and protocol versions. With VAG 20, FIREMAN 24 is called to tell the central electronic computing device 10 to execute commands. COAST 32 calls VEP 36 to publish events every time a process is initialized, updated, or completed.

Each of FIREMAN 24, SCRIPT 34, COAST 32, CODER 28 and SCRIBE 30 are configured to have multiple personal online data stores (PODS) running simultaneously. One process may be executed with a different SCRIPT 34 running different steps. The aforementioned modules or services may all grab from the QUEUE 40 and CACHE 44 to obtain the information they need. The initialization of processes and responses back from PROTOSS 42 all store the needed information in the CACHE 44 and QUEUE 40.

If there is an error, it is still reenqueued for SCRIPT 34 to pick up and follows essentially this same workflow 84 although SCRIPT 34 will execute the error step and be done with that process. If it is a TCU error, an acknowledgement is still sent back to the TCU of the mobile vehicle 16, so it knows, it does not need to retry, in order to stop the TCU from a further retry logic or processing.

Sometimes, when one service calls an outside service, it will retry a few times with exponential backoff before giving up.

In other words, the central electronic computing device 10 provides improvements to previous solutions. For example, with the central electronic computing device 10, developers 18 are provided with a complete platform that abstracts infrastructure and security, and provides auto-scaling, deployment pipelines, integration, instrumentation, logging, monitoring, operations, and testability as a service. This service comes in a pay-per-use-model, allowing development and business teams to reduce costs of infrastructure, operations, and development time. The target is to allow a developer 18 to ship remote command data packages 14 to a pre-production environment within a certain time, in particular and preferably within 24 hours. The new developer's 18 experience of shipping commands is designed by the following steps: In a first step, the developer 18 provides a scheme representing the values of vehicle messages. This scheme may be an XML-based WSDL, a Yaml representation, or even a Preon message Java file. In a second step, the developer 18 uses the central electronic computing device 10, in particular the user interface 12, to create a new service with only a handful of fields and buttons to fill out and press, respectively. In a third step, the developer 18 adds command types to this service with a button press, allowing them to name the command. In a fourth step, the developer 18 adds workflow steps to these command types. These workflow steps have specific types such as SentVehicleMessage, ReceiveVehicleMessage, Custom Code Blocks, along with error and timeout handlers. These step types may be templates described previously. Each step type requires minimal input from the developer 18 and may be dragged and dropped in the workflow 84. Vehicle message step types may be bound via a drop-down to a defined vehicle message. In a fifth step, with defined commands, developers 18 may now promote these commands from development to testing and then further to integration and eventual production. In a sixth step, once deployed, developers 18 may provision their API in a portal and now offer their vehicle commands as a service to other developer teams.

Once a vehicle command has been provisioned as a service, the authoring developer teams may move on to other initiatives and priorities, as the support and operations of that particular command are covered by the central electronic computing device 10 team. The development team will only be charged a marginal fee based on the amount of time their command was evoked rather than being charged for the entire infrastructure.

In some implementations, a developer 18 and/or the platform performs one or more of the following operations. The first operation may be that the developer 18 uploads a vehicle message template, wherein the template is uploaded to SCRIBE 30 (Scheme Retrieval Interface for Binding Entities). The template is synthetically parsed and checked for errors. Non-Java templates are transformed into a Java Preon Message Class. Java files are compiled into class files and moved to a stage bucket in CACHE 40. SCRIPT 34 uses a polling thread with a Spring aware Class Loader to load new message types at run-time, and indexing classes by template ID.

A second operation may be that the developer 18 creates a new service and vehicular command. The service is a top-level data model for holding a collection of vehicular commands. This service is known and understood by the component CODER 28 (Command Definition Retrieval). The developer 18 adds a vehicle command (workflow 84) to their service. The developer 18 adds steps defining the step types within the command and providing values for specific fields. Once the developer 18 clicks "save", the workflow 84 is serialized into a document in the blob store. SCRIPT 38 has a polling thread that picks up new workflow documents, and indexes that workflow 84 by the vertical direction identifier. This allows new commands to be shipped at run time.

Another operation is testing. Testing is performed against a test cluster of the central electronic computing device 10 for a given region, for example, the United States or China. The developer 18 exposes their API, which points to the central electronic computing device 10, in particular to FIREMAN 24. The developer 18 defines assertions on a process and provides test VINs (vehicle identification numbers) for routing. The developer 18 proceeds with the test pressing "run test" in user interface 12 and calls the exposed API, triggering the end-to-end workflow 84 with callback to the user's session on completion of the process event.

A fourth operation may be the workflow 84 of the central electronic computing device 10. FIREMAN 24 has a generic command end point that are all exposed API points. The central electronic computing device 10 may be a Kubernetes cluster with Nginx ingress router, and external APIs are exposed. FIREMAN 24 initializes a process identification and identifies the vehicle identification number that is a command type via the context pass of the API. FIREMAN 24 calls VVR 26 to determine the type of telemetric control unit (TCU) of the motor vehicle 16. FIREMAN 24 calls SCRIBE 30 and CODER 28 with this information to retrieve the workflow 84 and template identifications that will be used. FIREMAN 24 caches the process and its metadata within the CACHE 44. FIREMAN 24 calls initAndEnqueue endpoint on COAST 32 (Codex Advanced-command-protocol Status). COAST 32 checks a VIN-service specific queue to determine if the command allows concurrent use with multiple users and if another user is currently using the queue. If there is a conflict of users, COAST 32 explicitly rejects the command and informs the user. COAST 32 exists in two modes: API and consumer. API generates an event hub, where a COAST 32 listener picks up these events for handling. Events include initializing, enqueued, processing, waiting, timeout, and completion events. On completion events, COAST 32 reads the next command in the queue to ensure one command of a specific command type is in flight to the motor vehicle 16 at any moment. On release of an event, COAST 32 enqueues a process reference to a bus. SCRIPT 34 consumes messages from the bus. On handling, SCRIPT 34 retrieves the process from the CACHE 44, and fetches both a workflow 84 and template in-memory. A workflow orchestration framework processes the series of steps within the process. SendAtpCommand and sendAtpResponse step types indicate to SCRIPT 34 to stop processing and to proceed with the next process in the service bus. SCRIPT 34 calls an API of COAST 32 to update the process status from "enqueued" to "processing" when it starts processing a command, and to "waiting" when it moves on. SCRIPT 34 also updates the process status to "complete" on finishing the final step of a process, and "error" or "time out" if either condition presents itself in processing.

For all process status changes, COAST 32 listener publishes an event to VEP 36, informing any user of the central electronic computing device 10 of command updates. On sent ATP command and sent API response, SCRIPT 34 dispatches a serialized binary payload along with necessary metadata via PROTOSS 42 (PROTOcol State Service). PROTOSS 42 composes the vehicle message, assigning a transaction ID and call OCG (outbound communication gateway), which may be the communication device 22, which will deliver the binary message to the vehicle over mobile network operator partner networks. The transaction ID is associated to the process ID for reference later. Upon receiving the initial command, the vehicle opens a data connection to the backend and requests subsequent information it needs to complete the transaction. The request goes over either MQTT or HTTP and events a TPG (telematic protocol gateway). The TPG looks up the route of the message recipient using the service ID header. All services from the central electronic computing device 10 are rooted to PROTOSS 42. PROTOSS 42 holds open the synchronous connection, and uses the transaction ID of the message to look up the associated process ID. PROTOSS 42 writes the vehicle message to the process variable set in the CACHE 44, along with its own IP address, to allow the asynchronous workflow 84 to find the correct connection to respond back to the vehicle. After writing the vehicle message, PROTOSS 42 enqueues a process reference to the service bus to allow SCRIPT 34 to resume processing of the command. Upon SCRIPT 34 receiving the resumed process reference, SCRIPT 34 retrieves the process from CACHE 44. SCRIPT 34 uses the template class to deserialize the binary payload into a Java object, which it then serializes to, for example JSON, for random access of variables.

SCRIPT 34 formulates a response to the motor vehicle 16 with the data requested. SCRIPT 34 then deserializes to a Java template class, which then serializes into the arbitrary binary payload. SCRIPT 34 calls PROTOSS 42 identified by a call back IP address with the response payload, to ensure the response is sent to the correct motor vehicle 16. The entire command workflow 84 may require an arbitrary number of messages to the motor vehicle 16, which would loop through the pattern of dispatch, suspend processing, receive message, and resume processing. Upon completion of a command, the command status is finalized, and the process is called back via HTTP API with all process states, for persistence or testing assertion.

Another option is a promotion. With commands provisioned and tested, the developers 18 may promote their command to new stages and regions. The initial stage is the test of the environment of central electronic computing device 10 for a given region. The developers 18 may promote a remote command from test to integration and finally production. This promotion mechanism simply moves the serialized workflow 84 and template classes that are region/state specific to the blob store location, where a localized SCRIPT 34 instantly picks them up. After promotion, the developers 18 may choose to provision APIs for the given region and stage in order to allow users to call the remote command as a service. These provisioned APIs are metered to track cost allocation for users.

Figure 2:
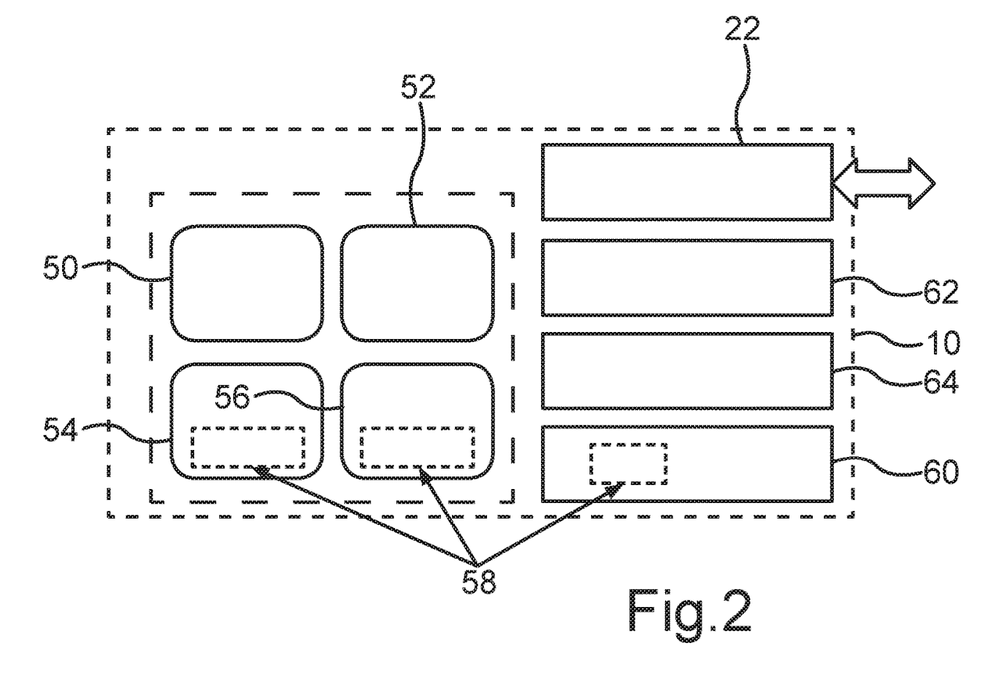
FIG. 2 a diagram of an example of a central electronic computing device in which some described embodiments may be implemented.

FIG. 2 shows a schematic view of an embodiment of the central electronic computing device 10, wherein the central electronic computing device 10, may be configured to perform a method according to the preceding aspect shown in FIG. 1. The shown central electronic computing device 10 is not intended to suggest any limitation as to scope of use or functionality, as the technologies may be implemented in diverse general-purpose or special-purpose computing systems.

With reference to FIG. 2, the electronic computing device 10 may comprise one or more processing units 50, 52 and memories 54, 56. The processing units 50, 52 execute computer-executable instructions. A processing unit may be a general-purpose central processing unit (CPU), processor in an application-specific integrated circuit (ASIC) or any other type of processor. In a multi-processing system, multiple processing units execute computer-executable instructions to increase processing power. For example, FIG. 2 shows a computer processing unit 50 as well as a graphic processing unit or co-processing unit 52. The tangible memory 54, 56 may be a volatile memory, a non-volatile memory, a combination of the two, accessible by the processing units 50, 52. The memory 54, 56 stores software 58 implementing one or more technologies described herein, in the form of computer-executable instructions suitable for execution by the processing units 50, 52.

The central electronic computing device 10 may have additional features. For example, the central electronic computing device 10 includes a storage 60, one or more input devices 62, one or more output devices 64 and one or more communication devices 22. An interconnection mechanism, which is not shown, such as a bus, controller, or network, interconnects the components of the central electronic computing device 10. Typically, operation system software, which is also not shown, provides an operating environment for other software executing in the central electronic computing device 10, and coordinates activities of the components of the central electronic computing device 10.

The tangible storage 60 may be removable or non-removable and includes magnetic discs, magnetic tapes or cassettes, CD-ROMs, DVDs, or any other medium which may be used to store information in a non-transitory way and which may be accessed with the computing device 10. The storage 60 stores instructions for the software 58 implementing one or more technologies described herein.

The input device(s) 62 may be a touch input device such as a keyboard, mouse, pen, or trackball, a voice input device, a scanning device, or another device that provides input to the computing system. For video encoding, the input device(s) 62 may be a camera, video card, TV tuner card, or similar device that accepts video input in analog or digital form, or a CD-ROM or CD-RW that reads video samples into the computing system 200. The output device(s) 64 may be a display, printer, speaker, CD-writer, or another device that provides output from the computing system.

The communication device 22 enables communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "device" are used interchangeably herein. Unless the context clearly indicates otherwise, neither term implies any limitation on a type of computing system or computing device. In general, a computing system or computing device may be local or distributed, and may include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

The technologies may be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

Figure 3:
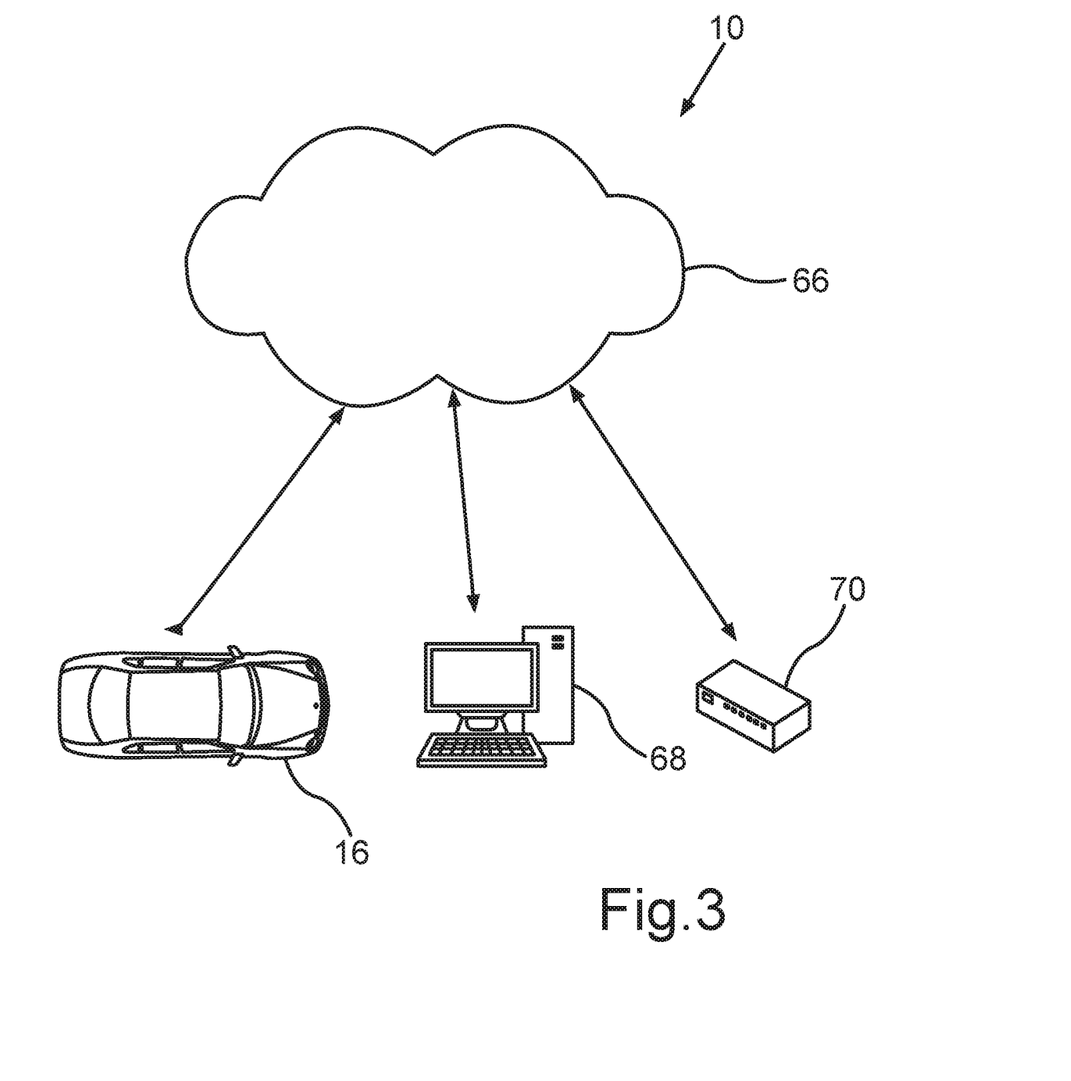
FIG. 3 an example of a cloud computing environment that may be used in conjunction with the technologies described herein.

FIG. 3 shows a schematic view according to an embodiment of the central electronic computing device 10. The central electronic computing device 10 may be configured as a cloud computing environment comprising cloud computing services 66. The cloud computing services 66 may comprise various types of cloud computing resources, such as a computer service, data storage repositories, networking resources, or furthermore. The cloud computing services 66 may be centrally located, for example, provided by a data center of a business or organization or distributed, for example, provided by various computing resources located at different locations, such as different data centers located in different cities or countries.

The cloud computing services 66 are utilized by various types of clients. For example, the cloud computing services 66 may be utilized by motor vehicles 16, for example, cars, trucks, and/or other types of vehicles, and/or by various components of the motor vehicle 16, for example, by navigation components, entertainment components, security components, vehicle control components, or otherwise. The cloud computing services 66 may also be utilized by computing devices 68, for example, desktop computers, laptop computers, tablets, smartphones and/or other types of computing devices. The cloud computing services 66 may also be utilized by other types of devices 70, such as internet of things devices.

For example, the various types of clients may utilize the cloud computing services 66 to perform computing operations, for example, messaging, data processing, data storage, and the like.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 2, computer-readable storage media include memory 54 and 56, and storage 60. The term computer-readable storage media does not include signals and carrier waves. In addition, the term computer-readable storage media does not include communication connections, such as 270.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

Figure 4A:
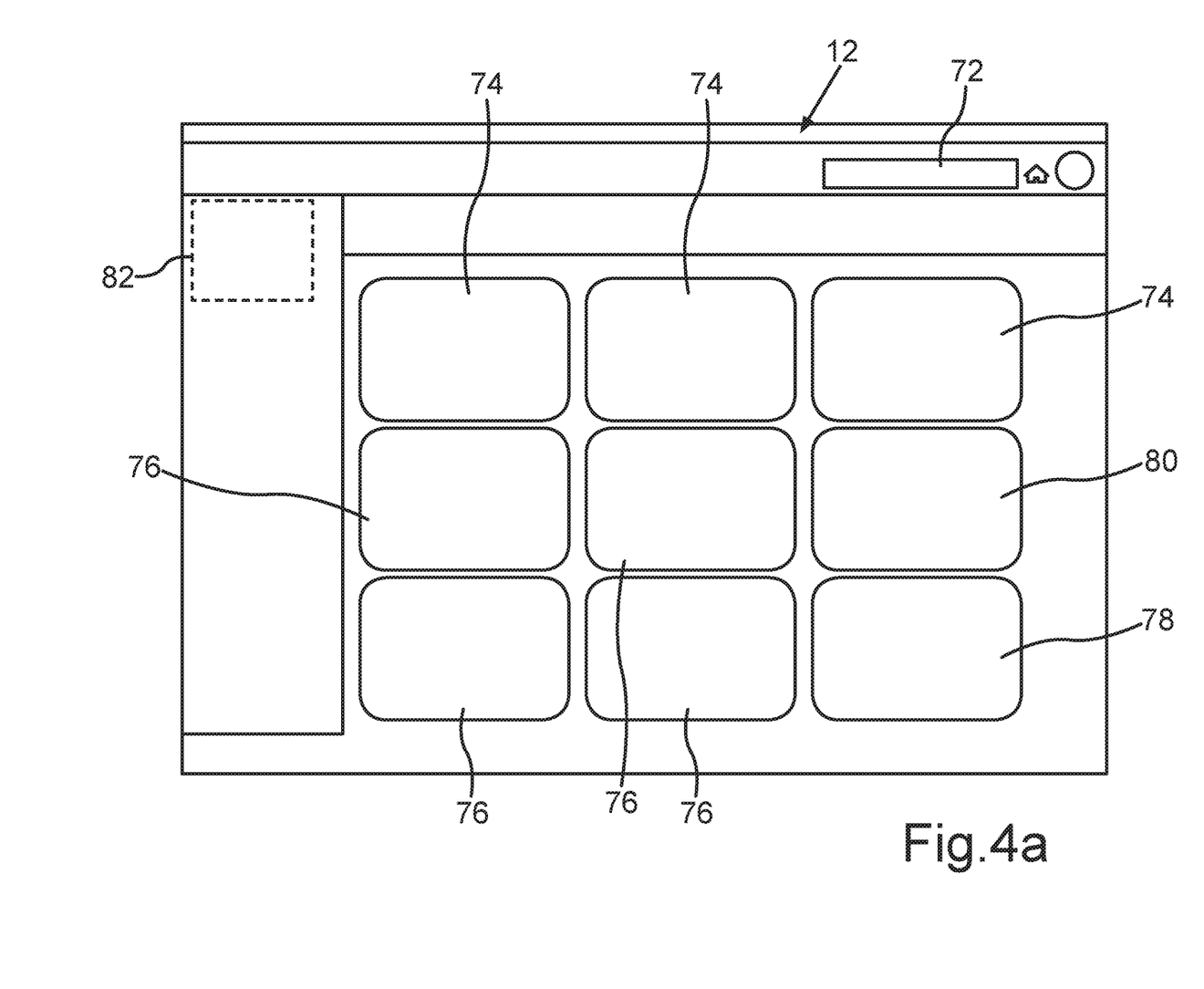
FIG. 4A-4D show different of examples of a user interface according to an embodiment of the invention.

The FIGS. 4A-4D show examples of the user interface 12 according to an embodiment. According to FIG. 4A the user interface 12 comprises a search line 72, whereby the developer 18 may search for different workflows 84. FIG. 4A shows different workflows 84 in different development stages. In a first stage 74 the workflow 84 may be in design.

In a second stage 76 the workflow 84 may be in test. In a fourth stage 80 the workflow 84 may be in an integration phase, wherein in a third stage 78 the workflow 84 may be in a production phase. Furthermore, the user interface 12 may comprise a list 82, wherein the developer 18 may choose between a project block, a building block, and a promotion block. FIG. 4A shows in this embodiment the project block.

Figure 4B:
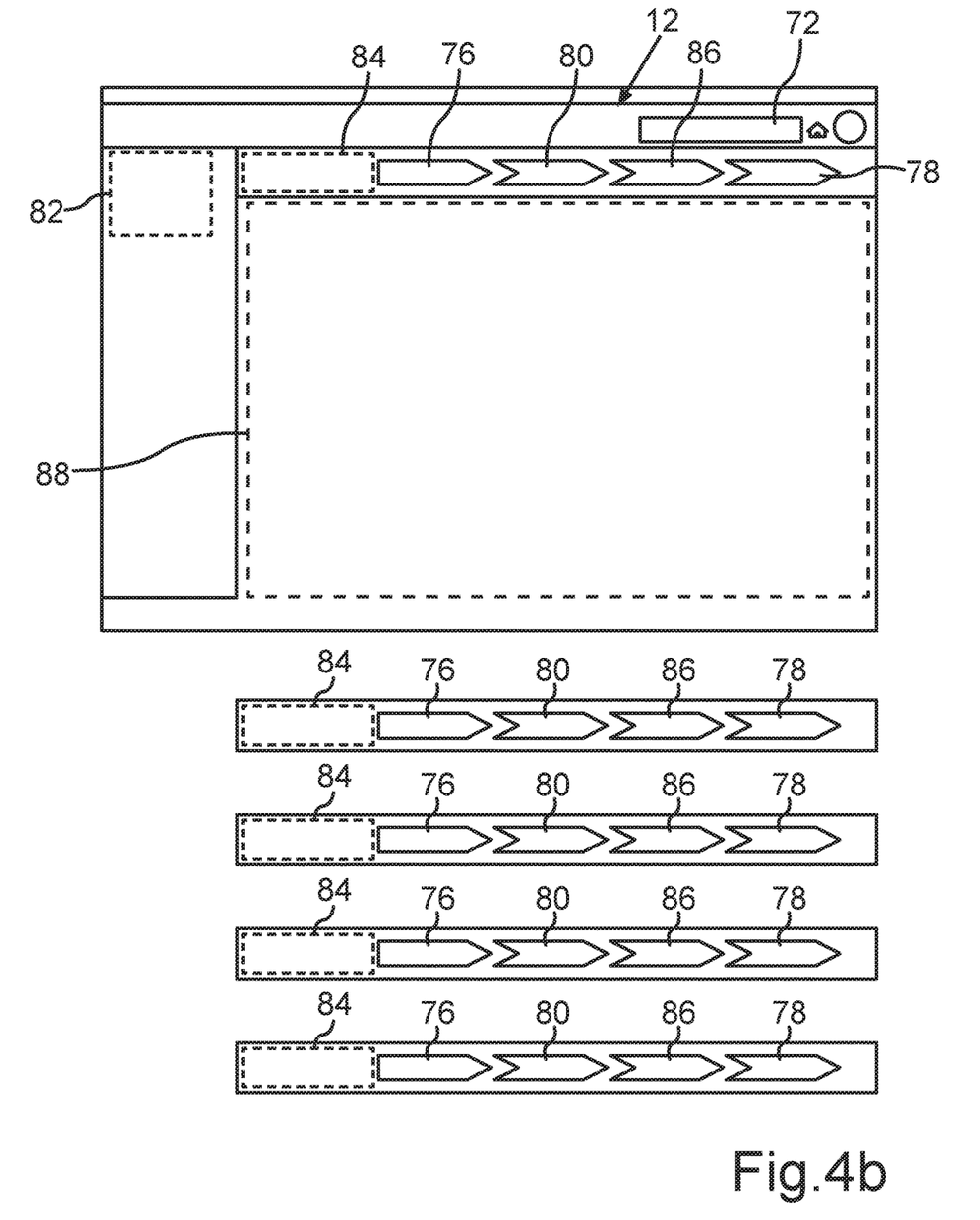

FIG. 4B shows the promotion block of the list 82. A name of the workflow 84 is shown. It is also possible to show beside the name of the workflow 84, in which stage the corresponding workflow 84 is in. The stage may comprise a further fifth stage 86, which may describe a pre-production phase. The stages, which are shown as arrows, may change the color according to which stage the workflow 84 is in. The user interface 12 may comprise a functionality box 88, wherein different functionalities are presented for the developer 18. The functionalities may comprise: choose a command workflow 84; prepare a test; command parameters, context; test setup; assertion definitions; failure metrics, run tests; optional test reports; predictive failure; API management. Furthermore, the user interface according to FIG. 4B may show other names of workflows 84 and show the different stages the workflows 84 are in.

Figure 4C:
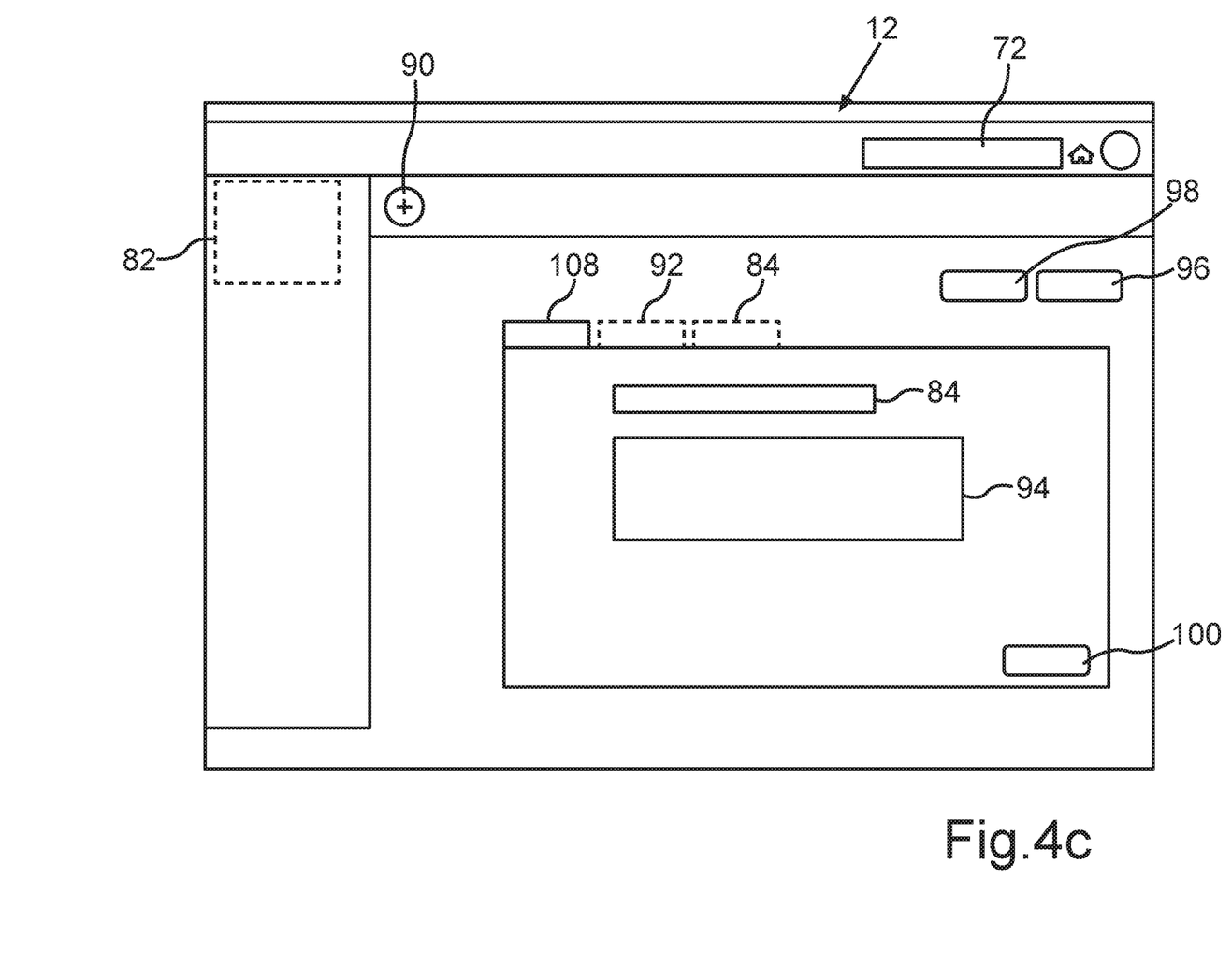

The embodiment of the FIG. 4C shows the building block of the list 82. A button 90 is shown, wherein the developer 18 may create a new workflow 84. There are three tabs shown, wherein in general tab 108, a name of the workflow 84 a description 94 may be created by the developer 18. In a template tab 92 the developer 18 may create a template. In the tab for the workflow 84, the developer 18 may create the workflow 84. Furthermore, the user interface may comprise a save-button 96, a cancel-button 98 and a next-button 100.

Figure 4D:
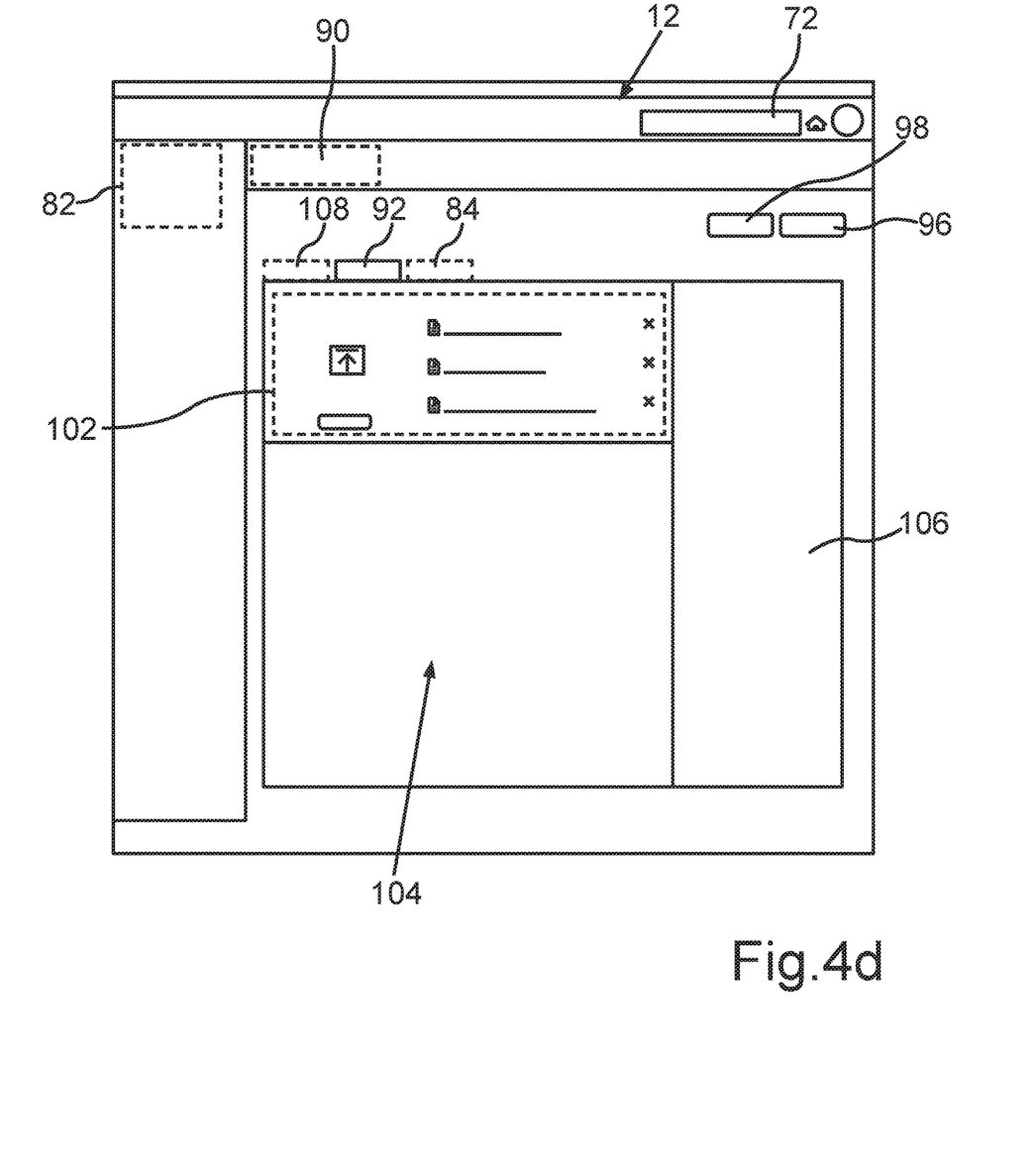

FIG. 4D shows the template tab 92 according to FIG. 4C. In the block 102 the developer 18 may upload templates. The developer 18 may drag the uploads in the block 102. The user interface 12 may comprise a block 104, wherein the developer may create a template in this block 104. In the block 106 a list of preexisting templates and/or a list of templates the developer already has created may be presented.

The invention claimed is:

1. A method for developing a remote command data package for a motor vehicle by a central electronic computing device, the method comprising:
   providing, by the central electronic computing device, a plurality of templates in a user interface of the central electronic computing device, wherein a single template defines at least one abstract vehicle command;
   providing, by a developer of the remote command data package using the user interface, a workflow defining logic for the remote command data package, wherein the developer provides the workflow by using at least one template of the plurality of templates;
   transforming, by the central electronic computing device, the workflow into a vehicle-specific command for the motor vehicle depending on the at least one template used by the developer by mapping the at least one abstract vehicle command into the vehicle-specific command; and
   transmitting, by the central electronic computing device, the vehicle-specific command in a remote command package to the motor vehicle,
   wherein the central electronic computing device is external to the motor vehicle.

2. The method of claim 1, wherein the developer uses the user interface to develop the at least one template.

3. The method of claim 1, wherein the central electronic computing device is a serverless cloud computing platform.

4. The method of claim 1, wherein the central electronic computing device comprises a communication device configured to communicate with the motor vehicle, and wherein the remote command data package is transmitted via the communication device to the motor vehicle.

5. The method of claim 1, wherein the workflow provided by the developer or a developed template is tested by a testing unit of the central electronic computing device prior to the transmission of the vehicle command in the remote command package to the motor vehicle.

6. The method of claim 1, wherein the central electronic computing device provides the at least one template depending on a characterizing parameter of the motor vehicle.

7. A computer-readable storage medium storing computer-executable instructions for developing a remote command data package for a motor vehicle by a central electronic computing device, which when executed by the central electronic computing device, causes the central electronic computing device to:
   provide a plurality of templates in a user interface of the central electronic computing device, wherein a single template defines at least one abstract vehicle command;
   receive, from a developer of the remote command data package using the user interface, a workflow defining logic for the remote command data package, wherein the developer provides the workflow by using at least one template of the plurality of templates;
   transform the workflow into a vehicle-specific command for the motor vehicle depending on the at least one template used by the developer by mapping the at least one abstract vehicle command into the vehicle-specific command; and
   transmit the vehicle-specific command in a remote command package to the motor vehicle,
   wherein the central electronic computing device is external to the motor vehicle.

8. A central electronic computing device, comprising:
   at least one user interface; and
   at least one computer-readable storage medium for developing a remote command data package for a motor vehicle by a central electronic computing device, which when executed by the central electronic computing device, causes the central electronic computing device to
   provide a plurality of templates in the at least one user interface of the central electronic computing device, wherein a single template defines at least one generalized vehicle command;
   receive, from a developer of the remote command data package using the at least one user interface, a workflow defining logic for the remote command data package, wherein the developer provides the workflow by using at least one template of the plurality of templates; and
   transform the workflow into a vehicle-specific command for the motor-vehicle depending on the at least one template used by the developer by mapping the at least one abstract vehicle command into the vehicle-specific command; and
   transmit the vehicle-specific command in a remote command package to the motor vehicle,
   wherein the central electronic computing device is external to the motor vehicle.

* * * * *